(12) United States Patent
Swales et al.

(10) Patent No.: US 9,829,084 B2
(45) Date of Patent: Nov. 28, 2017

(54) INTEGRATED GEAR ASSEMBLY

(71) Applicant: GM GLOBAL TECHNOLOGY OPERATIONS LLC, Detroit, MI (US)

(72) Inventors: Shawn H. Swales, Canton, MI (US); Ionel I. Zanoaga, Sterling Heights, MI (US); Scott Vaubel, Attica, MI (US); Gary R. Valler, Greenfield, IN (US)

(73) Assignee: GM Global Technology Operations LLC, Detroit, MI (US)

(*) Notice: Subject to any disclaimer, the term of this patent is extended or adjusted under 35 U.S.C. 154(b) by 558 days.

(21) Appl. No.: 14/317,508

(22) Filed: Jun. 27, 2014

(65) Prior Publication Data

US 2015/0377334 A1 Dec. 31, 2015

(51) Int. Cl.
| | |
|---|---|
| *F16H 48/10* | (2012.01) |
| *F16H 48/06* | (2006.01) |
| *B60K 17/16* | (2006.01) |
| *F16H 48/11* | (2012.01) |

(52) U.S. Cl.
CPC ............ *F16H 48/06* (2013.01); *B60K 17/16* (2013.01); *F16H 48/10* (2013.01); *B60Y 2200/22* (2013.01); *F16H 48/11* (2013.01); *F16H 2048/106* (2013.01)

(58) Field of Classification Search
None
See application file for complete search history.

(56) References Cited

U.S. PATENT DOCUMENTS

| | | | |
|---|---|---|---|
| 6,117,038 A * | 9/2000 | Nishiji | B60K 17/16 475/198 |
| 6,401,850 B1 * | 6/2002 | Bowen | B60K 1/00 180/65.25 |
| 2005/0009660 A1 | 1/2005 | Nishiji | |

FOREIGN PATENT DOCUMENTS

| | | | | |
|---|---|---|---|---|
| CN | 1351696 A | 5/2002 | | |
| CN | 1474074 A | 2/2004 | | |
| CN | 102753858 A | 10/2012 | | |
| DE | WO 2013013841 A1 * | 1/2013 | ............ | F16H 48/10 |
| EP | 1449706 A2 | 3/2004 | | |
| JP | 2002301941 A | 10/2002 | | |
| WO | 2004029478 A1 | 8/2004 | | |

* cited by examiner

*Primary Examiner* — Erin D Bishop
(74) *Attorney, Agent, or Firm* — Quinn IP Law

(57) ABSTRACT

An integrated gear assembly includes a conjoined carrier assembly coupling a reducing gear set to a differential gear set. This includes first, second and third coaxial sun gears. The first sun gear meshingly engages first gear elements of stepped pinion gears of the reducing gear set. The second sun gear meshingly engages third pinion gears of the differential gear set. The third sun gear meshingly engages fourth pinion gears of the differential gear set. The third pinion gears of the differential gear set axially overlap second gear elements of the stepped pinion gears of the reducing gear set. The fourth pinion gears of the differential gear set axially overlap the third pinion gears of the differential gear set.

15 Claims, 4 Drawing Sheets

INTEGRATED GEAR ASSEMBLY

TECHNICAL FIELD

The disclosure relates to gear sets for transferring mechanical power, including torque transfer in a ground vehicle.

BACKGROUND

The statements in this section merely provide background information related to the present disclosure and may not constitute prior art.

Developers of torque transmission devices seek to provide devices that meet requirements and constraints related to performance, weight, packaging and durability, among others.

SUMMARY

An integrated gear assembly is described, including a conjoined carrier assembly coupling a reducing gear set to a differential gear set. The integrated gear assembly includes first, second and third coaxial sun gears. The first sun gear meshingly engages first gear elements of stepped pinion gears of the reducing gear set. The second sun gear meshingly engages third pinion gears of the differential gear set. The third sun gear meshingly engages fourth pinion gears of the differential gear set. The third pinion gears of the differential gear set axially overlap second gear elements of the stepped pinion gears of the reducing gear set. The fourth pinion gears of the differential gear set axially overlap the third pinion gears of the differential gear set.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Like numerals refer to like elements throughout the specification.

Figure 1:
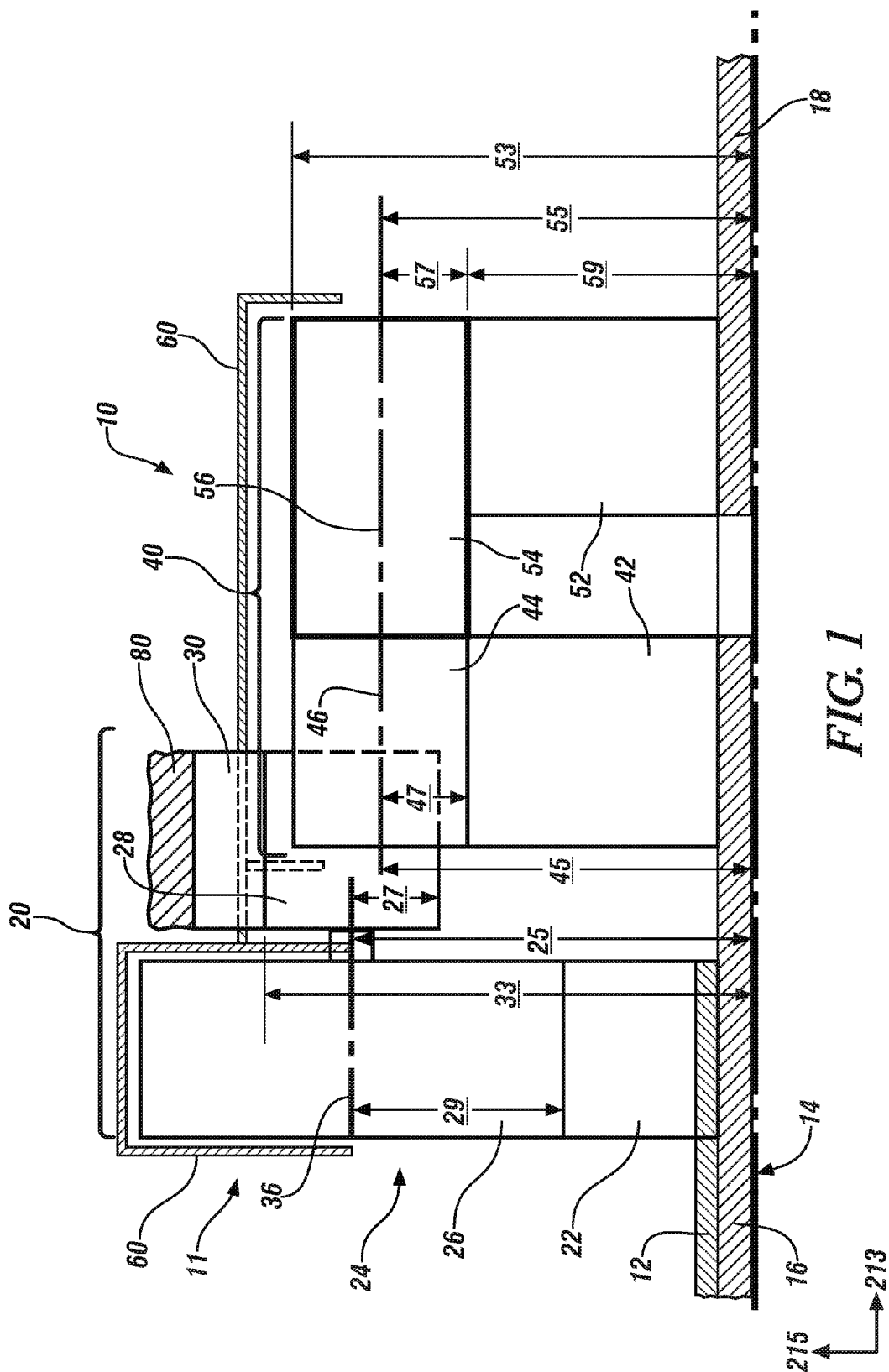
FIG. 1 schematically illustrates a cross-sectional half-view of an integrated torque-transfer gear set, in accordance with the disclosure.

Referring now to the drawings, wherein the depictions are for the purpose of illustrating certain exemplary embodiments only and not for the purpose of limiting the same, FIG. 1 schematically illustrates an integrated torque-transfer gear set 10 that has been constructed in accordance with an embodiment of the disclosure. The illustration includes a simplified schematic cross-sectional half-view shown in context of a horizontal axis 213 and a vertical axis 215. When deployed on a ground vehicle, the horizontal axis 213 corresponds to a transverse or lateral direction and the vertical axis 215 corresponds to an elevation direction. A centerline 14 shown parallel to the horizontal axis 213 defines an axis of rotation for elements of the integrated torque-transfer gear set 10 and the vertical axis 215 depicts a radial direction from the centerline 14. The integrated torque-transfer gear set 10 rotatably couples to an input member 12 and first and second output members 16 and 18, respectively, which couple to first and second wheel assemblies (not shown), respectively in one embodiment. The input member 12 and the first and second output members 16, 18 are preferably coaxial devices commonly sharing the axis of rotation.

The various gear elements described herein may be any suitable gear type, including, e.g., spur, bevel, helical or other gear type without limitation. The integrated torque-transfer gear set 10 includes an integrated gear assembly 11 that meshingly engages a stationary annular ring gear 30 that fixedly mounts to a housing 80. The housing 80 fixedly mounts to a structural or other fixed element of a ground vehicle in one embodiment. The integrated gear assembly 11 includes a reducing gear assembly 20 and a differential gear assembly 40 assembled to and rotationally coupled by a conjoined carrier assembly 60. Details of an embodiment of the conjoined carrier assembly 60 are described with reference to FIGS. 3 and 4.

The reducing gear assembly 20 includes a first sun gear 22 meshingly engaging a plurality of stepped pinion gears 24 that meshingly engage the ring gear 30. The first sun gear 22 is coaxial to and rotatably couples to the input member 12. The stepped pinion gears 24 each include a first gear element 26 coaxial to and rotatably coupled to a second gear element 28 at a first axis of rotation 36. The stepped pinion gears 24 rotatably assemble onto the conjoined carrier assembly 60 using axles and corresponding axle mounts. The first gear elements 26 meshingly engage the first sun gear 22. The second gear elements 28 meshingly engage the ring gear 30. Preferably, a first radius 29 of the first gear element 26 is greater than a second radius 27 of the second gear element 28, with a ratio of the first and second radii 29, 27 related to a gear reduction ratio. The first radius 29 is arranged at a center distance 25 from the axis of rotation 14, and an inner distance 33 is defined as a radial distance between the axis of rotation 14 and an outer radius of the second gear elements 28, which corresponds to an outer diameter defined by rotations of the second gear elements 28. A reducing center distance is defined as a difference between distance 25 and the second radius 27. Torque transferred from the input member 12 is multiplied through the reducing gear assembly 20 and the ring gear 30, with torque output from the reducing gear assembly 20 transferred to the differential gear assembly 40 through the conjoined carrier assembly 60.

The differential gear assembly 40 includes third and fourth independently rotating pinion gears 44, 54, respectively, that meshingly engage corresponding second and third sun gears 42, 52, respectively. The second sun gear 42 fixedly couples to the first output member 16 and rotates therewith, and the third sun gear 52 fixedly couples to the second output member 18 and rotates therewith. The second and third sun gears 42, 52 are preferably interchangeable, and preferably have common outside radii 59 and common tooth counts. The third and fourth independently rotating pinion gears 44, 54 preferably have common axes of rotation 46, 56, respectively, common outside radii 47, 57, respectively and common tooth counts. The third pinion gears 44 are fabricated into or otherwise assembled onto the conjoined carrier assembly 60 with the third axis of rotation 46 located at a third radius 45 relative to the axis of rotation 14. The fourth pinion gears 54 are fabricated into or otherwise assembled onto the conjoined carrier assembly 60 with the fourth axis of rotation 56 located at a fourth radius 55 relative to the axis of rotation 14 and preferably equal in length to the third radius 45. The third radius 45 can be employed to determine a differential center distance. As such the third and fourth pinion gears 44, 54 have in common an outer radius 53. The third pinion gears 44 and the fourth pinion gears 54 rotatably assemble onto the conjoined carrier assembly 60 using axles and corresponding axle mounts. Preferably the outer radius 53 of the third and fourth pinion gears 44, 54 is less than the inner distance 33 between the axis of rotation 14 and the outer radius of the second gear elements 28 to facilitate assembly of the integrated gear assembly 11 into the housing 80 past the ring gear 30. Furthermore, the differential center distance is less than the reducing center distance to ensure that there is no interference between the second sun gear 42 and the second gear elements 28 of the stepped pinion gears 24.

Torque from the reducing gear assembly 20 is transferred through the conjoined carrier assembly 60 to the differential gear assembly 40, which splits and transfer such torque to first and second output members 16 and 18, whose rotations are coupled through their connections through the wheels and the road surface when employed on-vehicle.

The differential gear assembly 40 as shown includes the third and fourth pinion gears 44, 54 configured as spur gears having equivalent diameters, centers and tooth counts that interact with second and third sun gears 42, 52 having equivalent diameters, centers and tooth counts, but it is appreciated that the concepts described herein apply to other differential gear configurations including configurations with pinion gears and corresponding sun gears having differing diameters, centers and tooth counts, including, e.g., bevel gear arrangements, helical gear arrangements and parallel gear arrangements.

Figure 2:
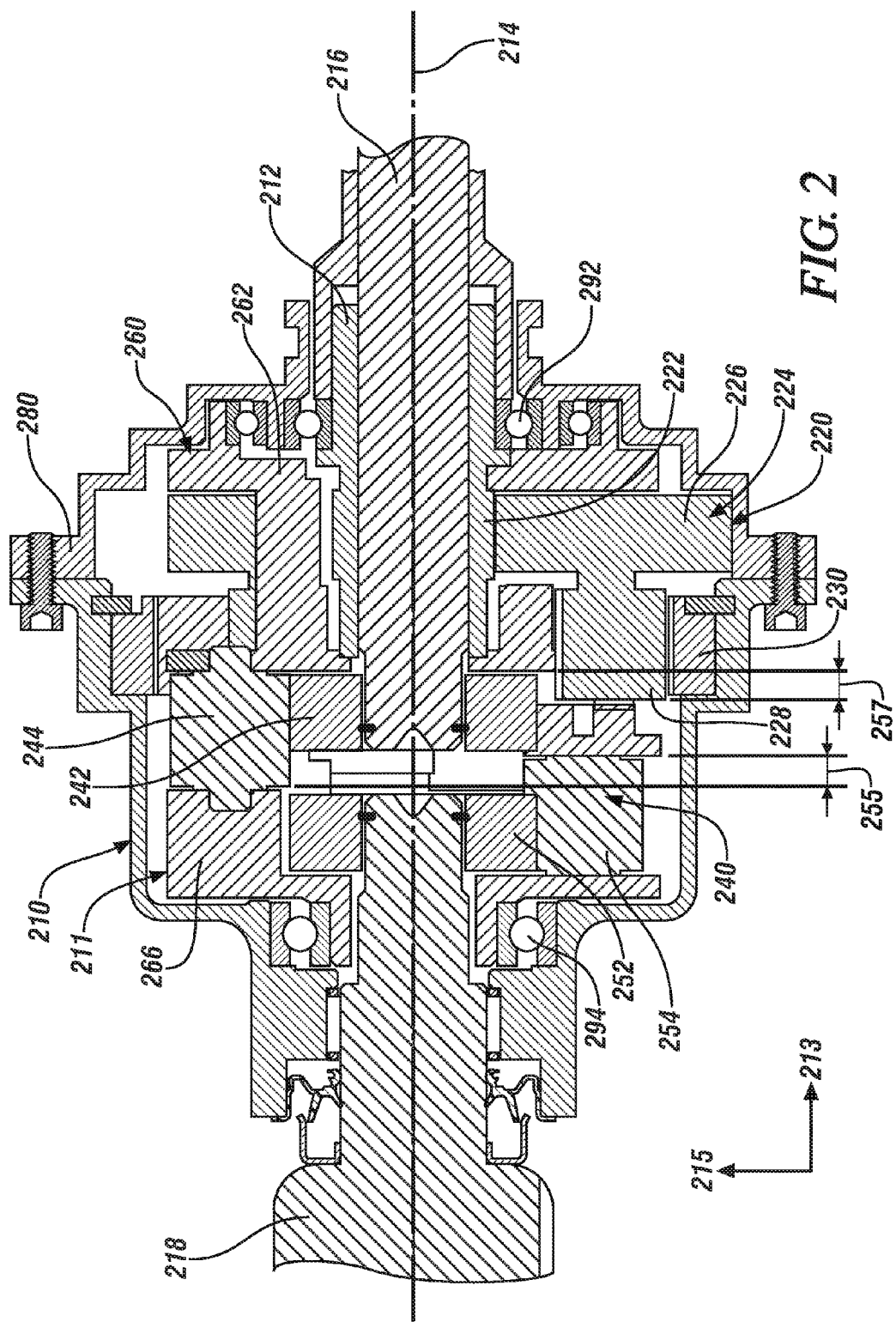
FIG. 2 schematically shows a two-dimensional cross-sectional drawing of an embodiment of the integrated torque-transfer gear set, in accordance with the disclosure.

FIG. 2 schematically shows a two-dimensional cross-sectional drawing of an embodiment of the integrated torque-transfer gear set 210 in context of a horizontal axis 213 and a vertical axis 215. When deployed on a ground vehicle, the horizontal axis 213 corresponds to a transverse or lateral direction and the vertical axis 215 corresponds to an elevation direction. A centerline 214 shown parallel to the horizontal axis 213 defines an axis of rotation for elements of the integrated torque-transfer gear set 210 and the vertical axis 215 depicts a radial direction from the centerline 214. The integrated torque-transfer gear set 210 rotatably couples to an input member 212 and first and second output members 216 and 218, respectively. The input member 212 and the first and second output members 216, 218 are preferably coaxial. The integrated torque-transfer gear set 210 includes an integrated gear assembly 211 that meshingly engages a stationary annular ring gear 230 that fixedly mounts to a housing 280. The integrated gear assembly 211 includes a reducing gear assembly 220 and a differential gear assembly 240 assembled to and rotationally coupled by a conjoined carrier assembly 260, which includes a first carrier element 262 and a coaxial second carrier element 266.

The reducing gear assembly 220 includes a first sun gear 222 meshingly engaging a plurality of stepped pinion gears 224 that meshingly engage the ring gear 230. The first sun gear 222 is coaxial to and rotatably couples to the input member 212. The stepped pinion gears 224 each include a first gear element 226 coaxial to and rotatably coupled to a second gear element 228, and rotatably assemble onto the first carrier element 262 using axles and corresponding axle mounts. The first gear elements 226 meshingly engage the first sun gear 222. The second gear elements 228 meshingly engage the ring gear 230. The differential gear assembly 240 includes third and fourth independently rotating pinion gears 244, 254, respectively, that meshingly engage corresponding second and third sun gears 242, 252, respectively. The second and third sun gears 242, 252 are preferably interchangeable. The third and fourth pinion gears 244, 254 are preferably interchangeable. The third pinion gears 244 assemble onto the conjoined carrier assembly 260 between the first carrier element 262 and the second carrier element 266 using axles and corresponding axle mounts. The fourth pinion gears 254 assemble onto the second carrier element 266 of the conjoined carrier assembly 260 using axles and corresponding axle mounts. The first carrier element 262 of the conjoined carrier assembly 260 rotatably mounts into and is supported in the housing 280 using bearing 292. The second carrier element 266 of the conjoined carrier assembly 260 rotatably mounts into and is supported in the housing 280 using bearing 294. The fourth pinion gears 254 of the differential gear set 240 axially overlap the third pinion gears 244 of the differential gear set 240 along the horizontal axis 213, thus reducing axial length, with axial overlapping depicted at 255. The third pinion gears 244 of the differential gear set axially overlap the second gear elements 228 of the stepped pinion gears 224 of the reducing gear set 220, with axial overlapping depicted at 257.

Figure 3:
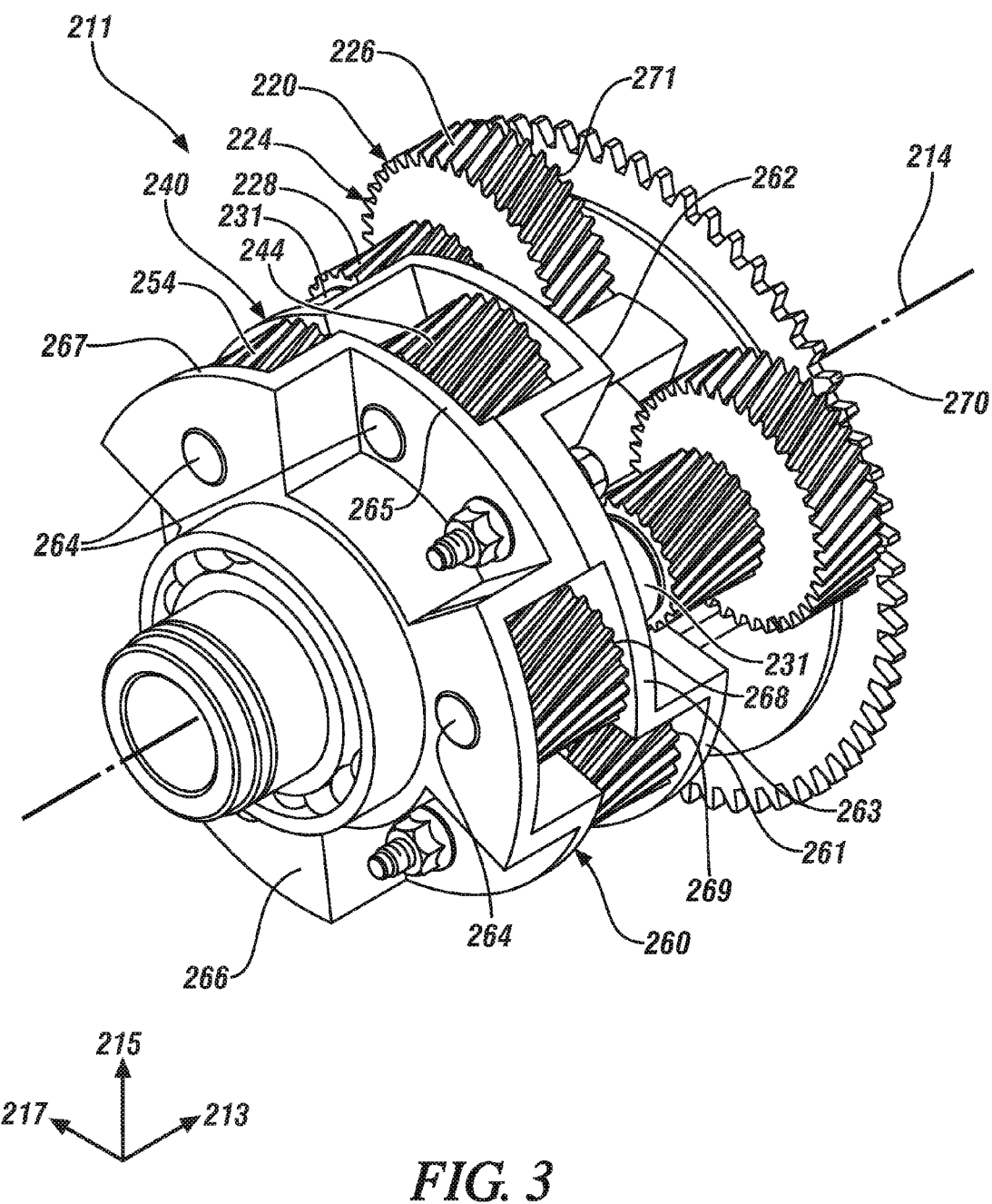
FIG. 3 schematically shows a three-dimensional isometric drawing of the integrated torque-transfer gear assembly, in accordance with the disclosure.
Figure 4:
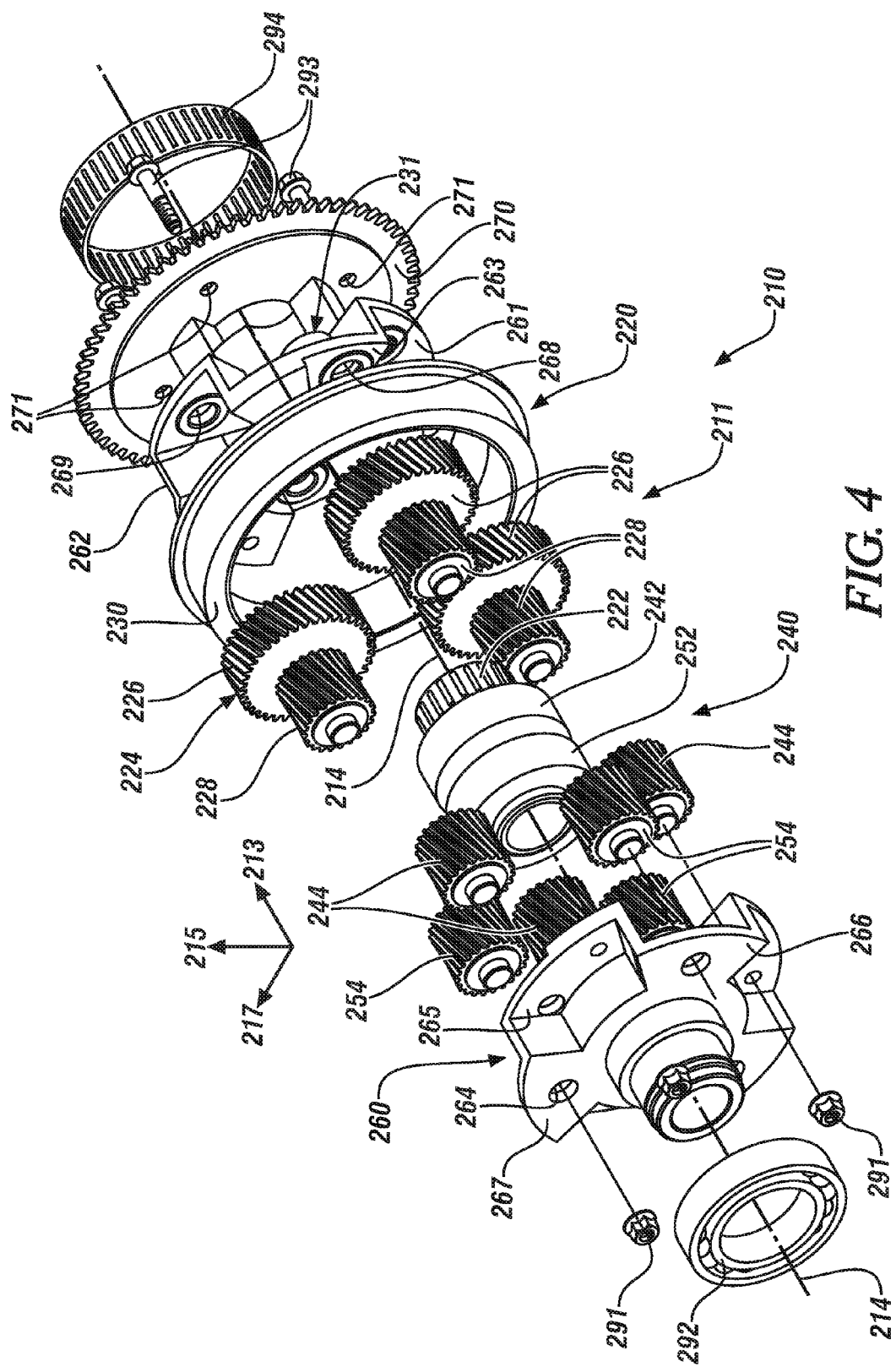
FIG. 4 schematically shows a three-dimensional exploded isometric drawing of the integrated torque-transfer gear set including the integrated gear assembly, in accordance with the disclosure.

FIG. 3 schematically shows a three-dimensional isometric drawing of the integrated gear assembly 211, which assembles into the integrated torque-transfer gear set 210 as shown in FIGS. 2 and 4. Centerline 214 is shown parallel to the horizontal axis 213 and defines an axis of rotation for elements of the integrated gear assembly 211 and the vertical axis 215 depicts a radial direction from the centerline 214. The integrated gear assembly 211 meshingly engages the stationary annular ring gear 230 as described herein. The integrated gear assembly 211 includes the reducing gear assembly 220 and the differential gear assembly 240 assembled to and rotationally coupled by the conjoined carrier assembly 260, which includes the first carrier element 262 and the coaxial second carrier element 266.

The reducing gear assembly 220 includes first sun gear 222 (not shown in FIG. 2) meshingly engaging the stepped pinion gears 224. The stepped pinion gears 224 each include the first gear element 226 coaxial to and rotatably coupled to the second gear element 228, and both rotatably assemble between the first carrier element 262 and an inner plate element 270 using axles and corresponding axle mounts. The first gear elements 226 meshingly engage the first sun gear 222 and the second gear elements 228 meshingly engage the ring gear 230 (shown in FIG. 2). The differential gear assembly 240 includes third and fourth independently rotating pinion gears 244, 254, respectively, that meshingly engage corresponding second and third sun gears 242, 252, respectively. The third pinion gears 244 assemble onto the conjoined carrier assembly 260 between the first carrier element 262 and the second carrier element 266 using axles and corresponding axle mounts. The fourth pinion gears 254 assemble onto the second carrier element 266 of the conjoined carrier assembly 260 using axles and corresponding axle mounts. The fourth pinion gears 254 of the differential gear set 240 axially overlap the third pinion gears 244 of the differential gear set 240 along the horizontal axis 213, thus reducing axial length. The third pinion gears 244 of the differential gear set axially overlap the second gear elements 228 of the stepped pinion gears 224 of the reducing gear set 220 along the horizontal axis 213, thus reducing axial length.

The conjoined carrier assembly 260 is fabricated with circumferentially alternating steps to secure the pinion gears and to effect axial overlapping of the pinion gears. This includes fabricating the first and second carrier elements 262, 266 in a manner that effects axial overlapping of the third pinion gears 244 with the fourth pinion gears 254 and axial overlapping of the third pinion gears 244 with the second gear elements 228 of the stepped pinion gears 224, thus reducing the axial length of the integrated gear assembly 211 and the axial length of the integrated torque-transfer gear set 210.

The second carrier element 266 includes a plurality of outer steps 267 alternating with a plurality of indents 265 that are arranged around its outer circumference. The outer steps 267 are arranged in a clocked staggered manner at nominal clock times of 12, 4 and 8 o'clock and are configured to provide outer pinion axle mounts 264 for the fourth pinion gears 254, wherein the nominal clock time of 12 o'clock corresponds to the vertical axis 215. The indents 265 are arranged in a clocked staggered manner at nominal clock times of 2, 6 and 10 o'clock and are configured to provide outer pinion axle mounts 264 for the third pinion gears 244 and to provide a bolt opening for assembly to the first carrier element 262. The axial length of the indents 265 is less than an axial length of the fourth pinion gears 254 to effect the axial overlapping between the third pinion gears 244 and the fourth pinion gears 254.

The first carrier element 262 includes a plurality of outer steps 263 alternating with a plurality of indents 261 that are arranged around its outer circumference. The outer steps 263 are arranged in a clocked staggered manner to correspond in part to the outer steps 267 of the second carrier element 266 at nominal clock times of 12, 4 and 8 o'clock and are configured to provide inner axle mounts 268 for the fourth pinion gears 254 and to provide a bolt opening for assembly to the second carrier element 266. The indents 261 are arranged in a clocked staggered manner to correspond in part to the indents 265 of the second carrier element 266 at nominal clock times of 2, 6 and 10 o'clock. The indents 261 are configured to provide inner axle mounts 269 for the third pinion gears 244 and to provide outer axle mounts 231 for the second gear elements 228 of the stepped pinion gears 224. The axial length of the indents 261 relative to the outer steps 263 is less than an axial length of the third pinion gears 244 to effect the axial overlapping with the fourth pinion gears 254, and is also less than an axial length of the second gear elements 228 to effect the axial overlapping with the third pinion gears 244. The conjoined carrier assembly 260 includes inner plate element 270 that includes a plurality of axle mounts 271 for the first gear elements 226 of the stepped pinion gears 224.

FIG. 4 schematically shows a three-dimensional exploded isometric drawing of the integrated torque-transfer gear set 210 including the integrated gear assembly 211 in context of horizontal axis 213, vertical axis 215 and longitudinal axis 217. Centerline 214 is shown parallel to the horizontal axis 213 and defines an axis of rotation for elements of the integrated torque-transfer gear set 210 and the vertical axis 215 depicts a radial direction from the centerline 214.

The integrated gear assembly 211 includes the reducing gear assembly 220 and the differential gear assembly 240 assembled to and rotationally coupled by the conjoined carrier assembly 260, which includes the first carrier element 262, the coaxial second carrier element 266 and the inner plate element 270.

The reducing gear assembly 220 includes first sun gear 222 meshingly engaging the stepped pinion gears 224. The stepped pinion gears 224 each include the first gear element 226 coaxial to and rotatably coupled to the second gear element 228, and both rotatably assemble between the first carrier element 262 and the inner plate element 270 using axles and corresponding axle openings. The first gear elements 226 meshingly engage the first sun gear 222 and the second gear elements 228 meshingly engage the annular ring gear 230.

The differential gear assembly 240 includes third and fourth independently rotating pinion gears 244, 254, respectively, that meshingly engage corresponding second and third sun gears 242, 252, respectively. The second and third sun gears 242, 252 are preferably interchangeable and the third and fourth pinion gears 244, 254 are preferably interchangeable. The third pinion gears 244 assemble onto the conjoined carrier assembly 260 between the first carrier element 262 and the second carrier element 266 using axles and corresponding axle mounts. The fourth pinion gears 254 assemble onto the second carrier element 266 of the conjoined carrier assembly 260 using axles and corresponding axle mounts. The conjoined carrier assembly 260 rotatably mounts and is supported using bearing 292. The second carrier element 266 of the conjoined carrier assembly 260 rotatably mounts and is supported using bearing 294. The fourth pinion gears 254 of the differential gear set 240 axially overlap the third pinion gears 244 of the differential gear set 240 along the horizontal axis 213, thus reducing axial length. The third pinion gears 244 of the differential gear set axially overlap the second gear elements 228 of the stepped pinion gears 224 of the reducing gear set 220 along the horizontal axis 213, thus reducing axial length.

The conjoined carrier assembly 260 is fabricated with circumferentially alternating steps to secure the pinion gears and to effect axial overlapping of the pinion gears. This includes fabricating the first and second carrier elements 262, 266 in a manner that effects axial overlapping of the third pinion gears 244 with the fourth pinion gears 254 and axial overlapping of the third pinion gears 244 with the second gear elements 228 of the stepped pinion gears 220, thus reducing the axial length of the integrated gear assembly 211 and thus reducing the axial length of the integrated torque-transfer gear set 210.

The second carrier element 266 includes outer steps 267 alternating with indents 265 that are arranged around its outer circumference. The outer steps 267 are arranged in a clocked staggered manner at nominal clock times of 12, 4 and 8 o'clock and are configured to provide outer pinion axle supports 264 for the fourth pinion gears 254. The indents 265 are arranged in a clocked staggered manner at nominal clock times of 2, 6 and 10 o'clock and are configured to provide outer pinion axle mounts 264 for the third pinion gears 244 and to provide a bolt opening for assembly to the first carrier element 262 employing bolts 293 and nuts 291 in one embodiment. The axial length of the indents 265 is less than an axial length of the fourth pinion gears 254 to effect the axial overlapping between the third pinion gears 244 and the fourth pinion gears 254.

The first carrier element 262 includes outer steps 263 alternating with indents 261 that are arranged around its outer circumference. The outer steps 263 are arranged in a clocked staggered manner to correspond in part to the outer steps 267 of the second carrier element 266 at nominal clock times of 12, 4 and 8 o'clock and are configured to provide inner axle mounts 268 for the fourth pinion gears 254 and to provide a bolt opening for assembly to the second carrier element 266. The indents 261 are arranged in a clocked staggered manner to correspond in part to the indents 265 of the second carrier element 266 at nominal clock times of 2, 6 and 10 o'clock. The indents 261 are configured to provide inner axle mounts 269 for the third pinion gears 244 and to provide outer axle mounts 231 for the second gear elements 228 of the stepped pinion gears 224. The axial length of the indents 261 relative to the outer steps 263 is less than an axial length of the third pinion gears 244 to effect the axial overlapping with the fourth pinion gears 254, and is also less than an axial length of the second gear elements 228 to effect the axial overlapping with the third pinion gears 244. The conjoined carrier assembly 260 includes an inner plate element 270 that includes axle mounts 271 for the first gear elements 226 of the stepped pinion gears 224.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. An integrated gear assembly, comprising:
   a conjoined carrier assembly coupling a reducing gear set and a differential gear set, wherein the reducing gear set includes a first sun gear, wherein the differential gear set includes second and third sun gears, and wherein the first, second and third sun gears are coaxial;
   the first sun gear meshingly engaging a plurality of first gear elements of a plurality of stepped pinion gears of the reducing gear set,
   the second sun gear meshingly engaging a third plurality of pinion gears of the differential gear set;
   the third sun gear meshingly engaging a fourth plurality of pinion gears of the differential gear set;
   the third plurality of pinion gears of the differential gear set axially overlapping a plurality of second gear elements of the plurality of stepped pinion gears of the reducing gear set; and
   the fourth plurality of pinion gears of the differential gear set axially overlapping the third plurality of pinion gears of the differential gear set.

2. The integrated gear assembly of claim 1, further comprising the third and fourth plurality of pinion gears having equivalent axes of rotation relative to an axis of rotation of the coaxially arranged second and third sun gears.

3. The integrated gear assembly of claim 1, wherein the conjoined carrier assembly comprises a first carrier element, a second carrier element and a plate element.

4. The integrated gear assembly of claim 3, wherein the first carrier element includes a plurality of steps alternating with a plurality of indents arranged around a circumference and including a plurality of first axle mounts for the fourth pinion gears, a plurality of second axle mounts for the third pinion gears, and a plurality of third axle mounts for the second gear elements of the stepped pinion gears.

5. The integrated gear assembly of claim 3, wherein the second carrier element includes a plurality of steps alternating with a plurality of indents arranged around a circumference and including a plurality of fourth pinion axle mounts for the fourth pinion gears.

6. The integrated gear assembly of claim 3, wherein the plate element includes a plurality of axle mounts for the first gear elements of the stepped pinion gears.

7. The integrated gear assembly of claim 1, comprising the third pinion gears mounted to the conjoined carrier assembly each having a differential center distance less than a reducing center distance of the second gear elements of the stepped pinion gears.

8. An integrated torque-transfer gear set for transferring torque between a torque machine and first and second wheel assemblies, comprising:
   an integrated gear assembly rotatably mounted in a housing, said integrated gear assembly comprising:
   a conjoined carrier assembly coupling a reducing gear set and a differential gear set, wherein the reducing gear set includes a first sun gear, wherein the differential gear set includes second and third sun gears, and wherein the first, second and third sun gears are coaxial,
   the first sun gear meshingly engaging a plurality of first gear elements of a plurality of stepped pinion gears of the reducing gear set,
   the second sun gear meshingly engaging a third plurality of pinion gears of the differential gear set,
   the third sun gear meshingly engaging a fourth plurality of pinion gears of the differential gear set,
   the third plurality of pinion gears of the differential gear set axially overlapping a plurality of second gear elements of the plurality of stepped pinion gears of the reducing gear set, and
   the fourth plurality of pinion gears of the differential gear set axially overlapping the third plurality of pinion gears of the differential gear set; and
   a stationary ring gear fixedly mounted in the housing concentric to the integrated gear assembly and meshingly engaging the first gear elements of the plurality of stepped pinion gears of the reducing gear set of the integrated gear assembly.

9. The integrated torque-transfer gear set of claim 8, comprising a single input member rotatably coupled between the torque machine and the first sun gear, and first and second output members rotatably coupled between the first and second wheel assemblies, respectively, and the second and third sun gears respectively, said single input member concentric to the first output member and coaxial to the first and second output members.

10. The integrated torque-transfer gear set of claim 8, further comprising the third and fourth plurality of pinion gears having equivalent axes of rotation relative to an axis of rotation of the coaxially arranged second and third sun gears.

11. The integrated torque-transfer gear set of claim 8, wherein the conjoined carrier assembly comprises a first coaxial carrier element, a second coaxial carrier element and a plate element.

12. The integrated torque-transfer gear set of claim 11, wherein the first coaxial carrier element includes a plurality of steps alternating with a plurality of indents arranged around a circumference and including a plurality of first axle mounts for the fourth pinion gears, a plurality of second axle mounts for the third pinion gears, and a plurality of third axle mounts for the second gear elements of the stepped pinion gears.

13. The integrated torque-transfer gear set of claim 11, wherein the second coaxial carrier element includes a plurality of steps alternating with a plurality of indents arranged around a circumference and including a plurality of pinion axle mounts for the fourth pinion gears.

14. The integrated torque-transfer gear set of claim 11, wherein the plate element includes a plurality of axle mounts for the first gear elements of the stepped pinion gears.

15. The integrated torque-transfer gear set of claim 8, comprising the third pinion gears mounted to the conjoined carrier assembly each having a differential center distance less than a reducing center distance of the second gear elements of the stepped pinion gears.

* * * * *